United States Patent
Raoul (10) Patent No.: US 9,307,482 B2
(45) Date of Patent: *Apr. 5, 2016

(54) NETWORK ACCESS MECHANISM BASED ON POWER

(71) Applicant: Marvell World Trade Ltd., St. Michael (BB)

(72) Inventor: Yann Raoul, Valencia (ES)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,877

(22) Filed: Apr. 15, 2015

(65) Prior Publication Data

US 2015/0223150 A1  Aug. 6, 2015

Related U.S. Application Data

(63) Continuation of application No. 13/668,591, filed on Nov. 5, 2012, now Pat. No. 9,030,955.

(60) Provisional application No. 61/557,321, filed on Nov. 8, 2011.

(51) Int. Cl.
*H04J 1/16* (2006.01)
*H04W 48/14* (2009.01)
*H04W 48/02* (2009.01)
*H04W 74/08* (2009.01)

(52) U.S. Cl.
CPC .............. *H04W 48/14* (2013.01); *H04W 48/02* (2013.01); *H04W 74/08* (2013.01)

(58) Field of Classification Search
None
See application file for complete search history.

(56) References Cited

U.S. PATENT DOCUMENTS

| | | | |
|---|---|---|---|
| 6,735,448 B1 * | 5/2004 | Krishnamurthy et al. | .... 455/522 |
| 7,085,284 B1 | 8/2006 | Negus | |
| 7,095,754 B2 | 8/2006 | Benveniste | |
| 7,787,487 B2 | 8/2010 | Liu | |
| 7,822,059 B2 | 10/2010 | Katar et al. | |
| 7,826,475 B2 * | 11/2010 | Lee et al. | ...................... 370/445 |
| 7,826,838 B1 | 11/2010 | Nanda et al. | |
| 7,990,997 B2 | 8/2011 | Wang et al. | |
| 8,130,783 B2 | 3/2012 | Lee et al. | |
| 2006/0245447 A1 | 11/2006 | Chou et al. | |

(Continued)

FOREIGN PATENT DOCUMENTS

WO  2008033514  3/2008

OTHER PUBLICATIONS

International Search Report and Written Opinion dated Jul. 29, 2014 from related/corresponding PCT/IB2014/002814 filed Nov. 5, 2012.

*Primary Examiner* — Kouroush Mohebbi (57) ABSTRACT

Systems and methods for accessing a contention-based communications network are provided. In systems and methods for accessing a contention-based communications network, an access point in the network is created. The access point is a first node connected to the network configured to receive a request from a second node to gain access to the network. A power of a signal transmitted between the access point and the second node is measured. A probability that the second node will access the network is determined based on the measured power of the signal transmitted between the access point and the second node. A determination of whether to permit the second node to gain access to the network is made based on the determined probability.

20 Claims, 6 Drawing Sheets

(56) References Cited

U.S. PATENT DOCUMENTS

| | | |
|---|---|---|
| 2007/0230497 A1 | 10/2007 | Choi et al. |
| 2007/0264952 A1 | 11/2007 | Buchwald et al. |
| 2008/0002734 A1 | 1/2008 | Zheng et al. |
| 2009/0196306 A1 | 8/2009 | King et al. |
| 2010/0329131 A1 | 12/2010 | Oyman et al. |
| 2010/0329174 A1 | 12/2010 | Shuey |
| 2011/0255548 A1 | 10/2011 | Johnson |
| 2012/0064935 A1 | 3/2012 | Hakola et al. |
| 2012/0198551 A1 | 8/2012 | Whitney |

\* cited by examiner

NETWORK ACCESS MECHANISM BASED ON POWER

CROSS-REFERENCE TO RELATED APPLICATIONS

This is a continuation of U.S. patent application Ser. No. 13/668,591, filed on Nov. 5, 2012, which claims priority to U.S. Provisional Patent Application No. 61/557,321, filed on Nov. 8, 2011, which is incorporated herein by reference.

TECHNICAL FIELD

The technology described in this patent document relates generally to communication networks, and more particularly to a contention-based network access mechanism for use in a communication network.

BACKGROUND

Contention-based network access mechanisms are employed in network communication protocols of a variety of different types of communication networks. For example, contention-based network access mechanisms are employed in local area networks (e.g., Ethernet networks), wireless networks (e.g., wireless networks based on the IEEE 802.11 standard), home area network (HAN) systems, and Advanced Metering Infrastructure (AMI) networks, among others. In a contention-based system, contestant nodes compete for a right or status in a communications network (e.g., the right to transmit over a shared broadcast medium or a right to join a network of nodes connected to the communications network). Such competition in a contention-based system typically occurs within a contention window, which is a window divided into a number of slots (e.g., 16 or 32) representing communication channels. In a contention, each contestant node selects a communication channel from among the slots of a contention window, and sends a contention participation message using the selected communication channel. When several contestant nodes are simultaneously attempting to join a network, the contestant node that selects the lowest slot is determined to have won the contention, and a new link in the network is created to connect the winning node to the network. Once connected to the network, the winning node and the other connected nodes of the network may share access to a communications medium via a variety of different protocols (e.g., Carrier Sense Multiple Access protocol, Time Division Multiple Access protocol, and so on).

SUMMARY

The present disclosure is directed to systems and methods for accessing a contention-based communications network. In a method for accessing a contention-based communications network, an access point in the network is created. The access point is a first node connected to the network configured to receive a request from a second node to gain access to the network. A power of a signal transmitted between the access point and the second node is measured. A probability that the second node will access the network is determined based on the measured power of the signal transmitted between the access point and the second node. A determination of whether to permit the second node to gain access to the network is made based on the determined probability.

In another example, a system for accessing a contention-based communications network includes an access point. The access point is a first node connected to the network config-ured to receive a request from a second node to gain access to the network. The system also includes the second node, which is configured to measure a power of a signal transmitted between the access point and the second node. The second node is also configured to determine a probability that the second node will access the network based on the measured power of the signal transmitted between the access point and the second node. The second node is further configured to request access to the network based on the determined probability.

DETAILED DESCRIPTION

Figure 1:
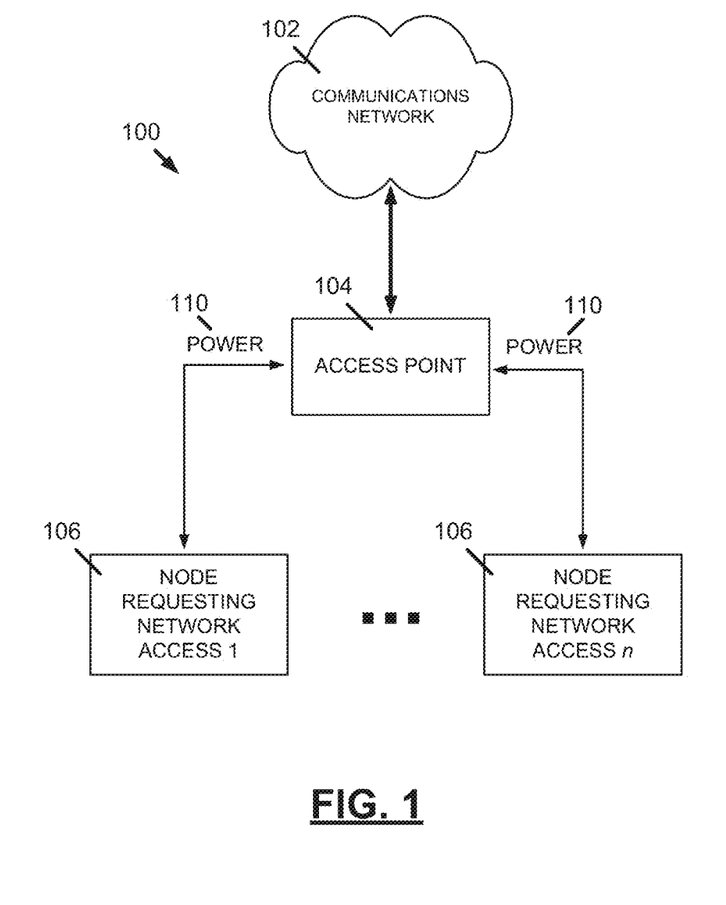
FIG. 1 is a block diagram of an example system for accessing a contention-based communications network based on a measurement of a power of a signal transmitted between an access point and a node requesting access to the network.

FIG. 1 is a block diagram of an example system for accessing a contention-based communications network based on a measurement of a power of a signal transmitted between an access point and a node requesting access to the network. In FIG. 1, a plurality of nodes 106 request access to a communications network 102 through the access point 104. The nodes 106 requesting access may represent a variety of different types of devices. In one example, the communications network 102 is the Internet, and the nodes 106 may comprise different wired or wireless devices (e.g., desktop computers, laptop computers, personal digital assistants, smartphones, cellphones, and other devices equipped to send and receive data over the Internet). In another example, the communications network 102 is an Advanced Metering Infrastructure (AMI) network, and the nodes 106 correspond to loads having meters (e.g., electric meters) and power line communication (PLC) modems configured to send and receive data over the AMI network. FIG. 1 depicts n nodes 106 seeking to gain access to the communications network 102, where n can be a number in the hundreds or thousands, and may thus represent a large number of nodes requesting network access.

The access point 104 is connected to the communications network 102 and is used by one or more of the nodes 106 to gain access to the network 102. In one example, the access point 104 is a base station device that connects wireless device nodes 106 with the network 102 to form a wireless network. In another example, the access point 104 is itself a node that previously gained access to the network 102 and is thereafter acting as a central controller configured to provide one or more of the nodes 106 with network access. The access point 104 may utilize a contention-based network access mechanism for granting one or more of the nodes 106 access to the network 102.

The determination of how to generate a next link in the network 102 (i.e., determining which of the nodes 106 should be given access to the network 102) is based on measurements of powers 110 of signals transmitted between the access point 104 and each of the nodes 106 requesting access to the network 102. The measured powers 110 of the signals are determined by, among other variables, the distance between the access point 104 and the nodes 106. Although the nodes 106 requesting access to the network 102 are depicted in FIG. 1 as being located at equal distances from the access point 104, in example systems, certain of the nodes 106 are closer in distance to the access point 104 than others, causing the nodes 106 closer in distance to the access point 104 to transmit signals having a relatively higher transmit power to the access point 104.

Figure 2A:
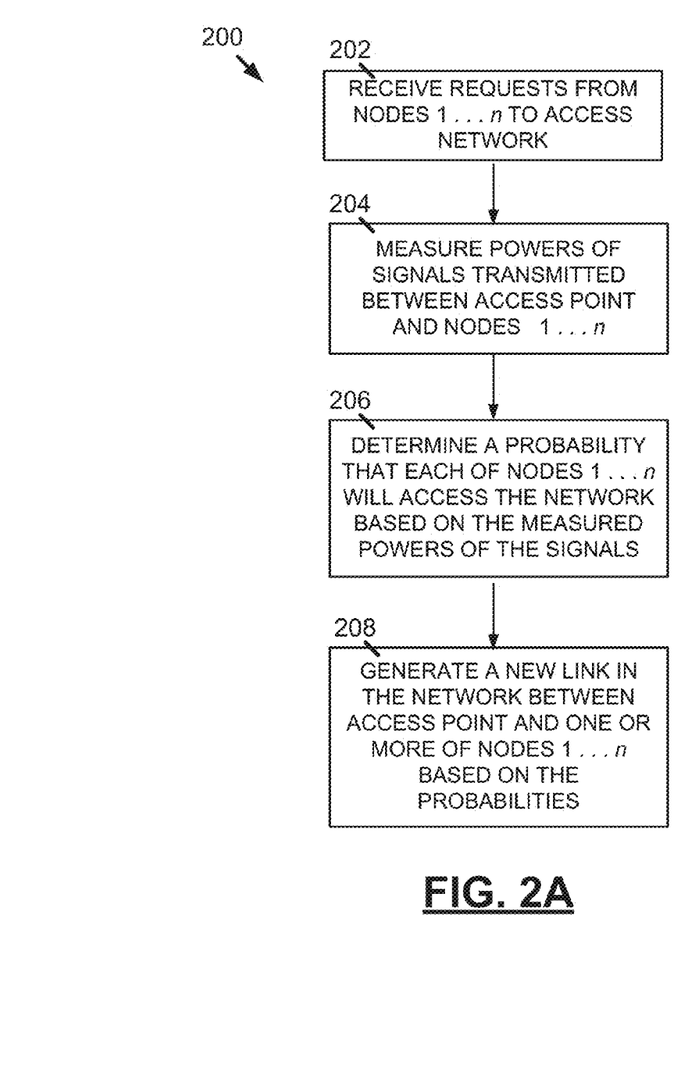
FIGS. 2A and 2B are flowcharts illustrating example steps performed by an access point and by a node requesting network access, respectively, for generating a network based on measurements of powers of signals transmitted between the access point and a plurality of the nodes requesting network access.

The access point 104 may determine which of the nodes 106 should be given access to the network 102 based on the steps illustrated in FIG. 2A. FIG. 2A is a flowchart 200 illustrating example steps performed by an access point for generating a network based on measurements of powers of signals transmitted between the access point and a plurality of nodes requesting network access. At 202, the access point receives requests from a plurality of nodes 1 . . . n to access a communications network. At 204, the access point measures powers of signals transmitted between the access point and each of the nodes. At 206, using the measured powers of the transmitted signals, the access point determines, for each of the nodes, a probability that the node will be given access to the network. If the access point measures a higher power of a signal transmitted between the access point and a particular node, the particular node is determined to have a higher probability of accessing the network. If the access point measures a lower power of a signal transmitted between the access point and a particular node, the particular node is determined to have a lower probability of accessing the network. At 208, the access point generates a new link in the network between the access point and one or more of the nodes based on the determined probabilities. A mechanism is used to inform nodes that they have been granted access to the network.

Figure 2B:
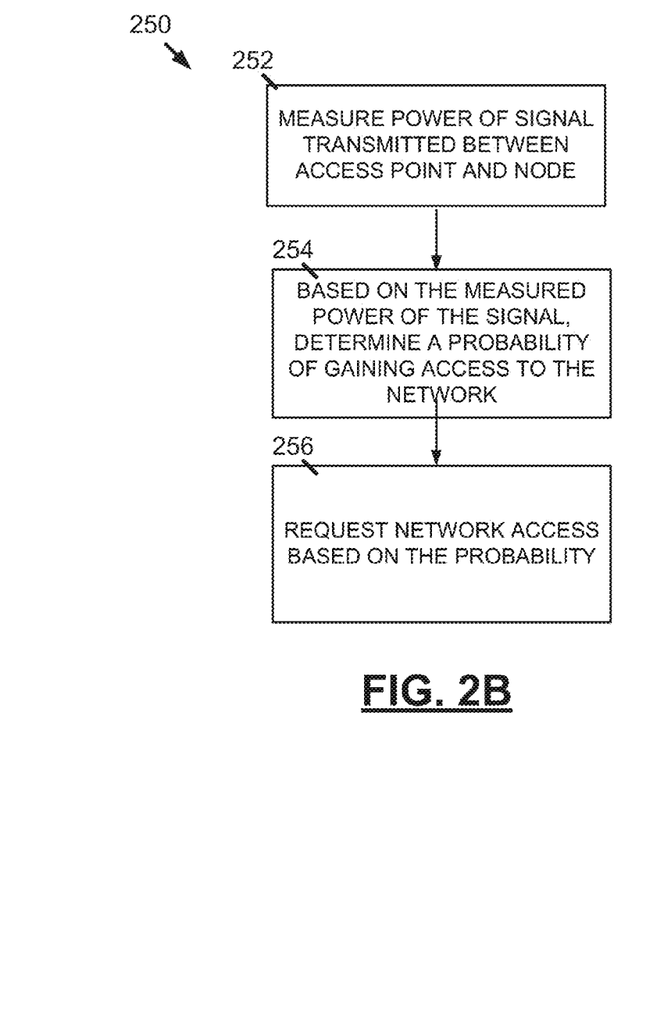

In the flowchart 200 of FIG. 2A, the access point determines which of the nodes is given access to the network using the measurements of the powers of the signals transmitted between the access point and the nodes. Under this method, the nodes merely request access to the network, while the access point ultimately controls network access by determining the probabilities based on the measurements of the powers of the signals transmitted between the access point and the nodes. In another example, as illustrated in flowchart 250 of FIG. 2B, the probability determination based on measurements of powers of signals transmitted between the access point and the nodes is instead made by each of the nodes requesting network access (e.g., nodes 106 in the example of FIG. 1). FIG. 2B illustrates example steps performed by a node for requesting access to a network based on a measurement of a power of a signal transmitted between an access point and the node. At 252, the node seeking to access the network measures a power of the signal transmitted between the access point and the node. At 254, the node determines a probability of gaining access to the network based on the measurement of the power of the signal. At 256, the node requests access to the network based on the determined probability. The request to access the network may be made in the context of a competition, where a plurality of other nodes are also requesting access to the network. If the node measures a high power of a signal transmitted between the access point and the node, the node determines that it has a higher probability of accessing the network and competes for access based on this higher probability. If the node measures a low power of a signal transmitted between the access point and the node, the node determines that it has a lower probability of accessing the network and competes for access based on this lower probability. The competition for network access may be, for example, via a contention-based network access mechanism.

Figure 3A:
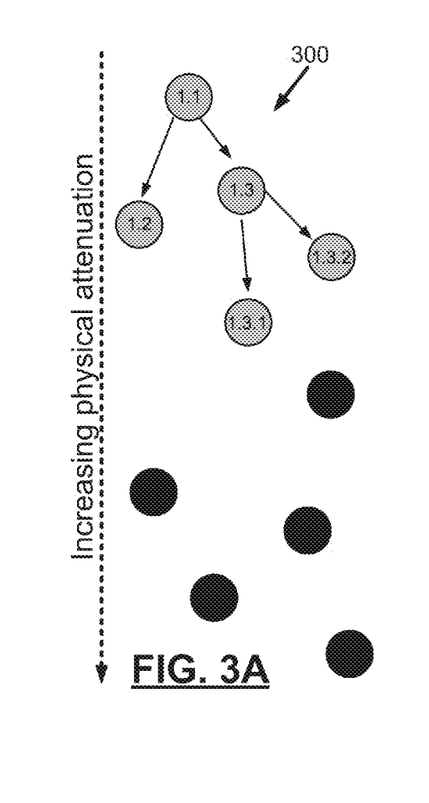
FIGS. 3A, 3B, and 3C illustrate an example network topology built up over time based on measurements of powers of signals transmitted between an access point and nodes requesting access to a network.
Figure 3B:
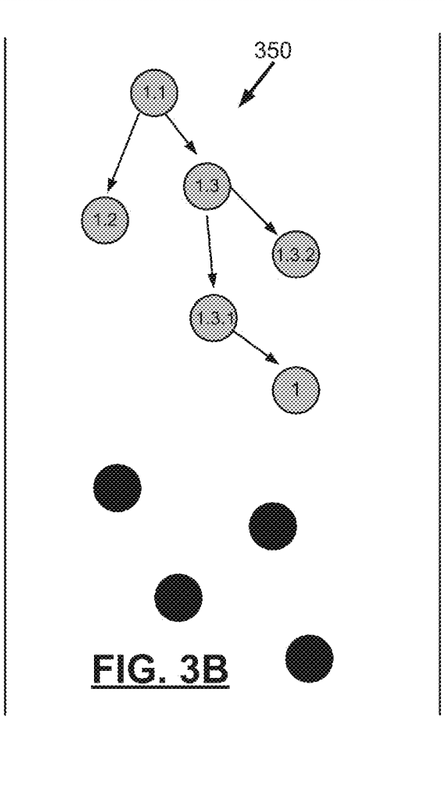
Figure 3C:
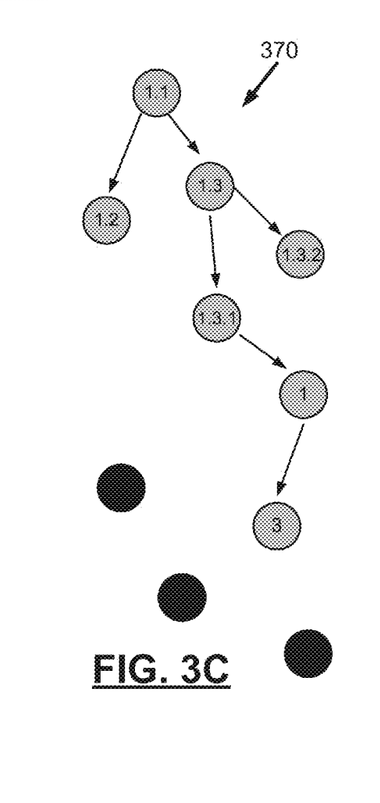

FIGS. 3A, 3B, and 3C illustrate an example network topology built up over time based on measurements of powers of signals transmitted between an access point and nodes requesting access to a network. FIG. 3A illustrates a network topology 300 at a first point in time. At the first point in time, a plurality of nodes are connected to the network 302 and a plurality of nodes require access to the network 304. Although FIG. 3A illustrates five nodes requiring access to the network 304, in some examples, the number of nodes requiring access may be in the hundreds or thousands. Due to the finite bandwidth of the network and the large number of nodes requiring access to the network, not all of the nodes 304 can be given access to the network simultaneously. Thus, the nodes requiring access to the network 304 may compete to access the network (e.g., via a contention-based network access mechanism), and new links in the network may be generated one-at-a-time to nodes determined to have won the access competitions.

In one example, a node already connected to the network 302 will, at various points in time, provide an opportunity for one or more of the nodes requiring access to the network 304 to join the network. In FIG. 3A, connected node 1.3.1 may provide an opportunity for one of the nodes requiring access to the network 304 to join the network. The connected node 1.3.1 acts as an access point by receiving requests from other nodes to gain access to the network and generating a new link in the network based on the requests. In determining how to generate the new link (i.e., determining which of the nodes requiring access to the network 304 should be given access), a system for accessing a communications network based on measurements of powers of signals transmitted between the access point and nodes requesting access to the network is utilized. In the system, the connected node 1.3.1 receives requests to gain access to the network from the nodes requiring access to the network 304, and powers of signals transmitted between the connected node 1.3.1 and each of the requesting nodes 304 are measured. For each of the nodes requiring network access 304, a probability that the node will be given network access is determined based on the measured power of the signal transmitted between the access point and the node. A new link in the network is generated to one or more of the nodes requiring network access 304 based on the determined probabilities.

FIG. 3B illustrates a network topology 350 at a second point in time, after the new link in the network has been generated based on the steps described above. In FIG. 3B, the new link in the network has been generated between the connected node 1.3.1 and node 1, which was previously one of the nodes requiring access to the network 304. The link in the network to the node 1 is created based on the proximity of the node 1 to the access point provided by the connected node 1.3.1. As compared to the other nodes requiring network access 304, the node 1 is closest in distance to the connected node 1.3.1, and thus, the measured power of the signal transmitted is highest between the node 1 and the connected node 1.3.1. Due to the signal transmitted between the node 1 and the connected node 1.3.1 having the highest measured power, the node 1 is determined to have a high probability of being given access to the network. With the high probability, the node 1 is biased to win a network access competition mechanism employed by the connected node 1.3.1. The node 1 thus wins the network access competition, causing the new link in the network to be generated between the connected node 1.3.1 and the node 1, as illustrated in FIG. 3B.

FIG. 3C illustrates a network topology 370 at a third point in time. After gaining access to the network, the node 1 may itself create a new link in the network to another of the nodes requiring access to the network 304. In FIG. 3C, the node 1 has created a new link in the network to a node 3 that was previously one of the nodes requiring access to the network. The link in the network to the node 3 is based on the proximity of the node 3 to the access point provided by the node 1. As compared to the other nodes requiring network access 304, the node 3 is closest in distance to the node 1, and thus, a signal transmitted between the node 3 and the node 1 has the highest measured power. Due to the high measured power of this signal, the node 3 is determined to have a high probability of being given access to the network. With the high probability, the node 3 wins the network access competition, causing the new link in the network to be generated between the node 1 and the node 3, as illustrated in FIG. 3C.

Figure 4A:
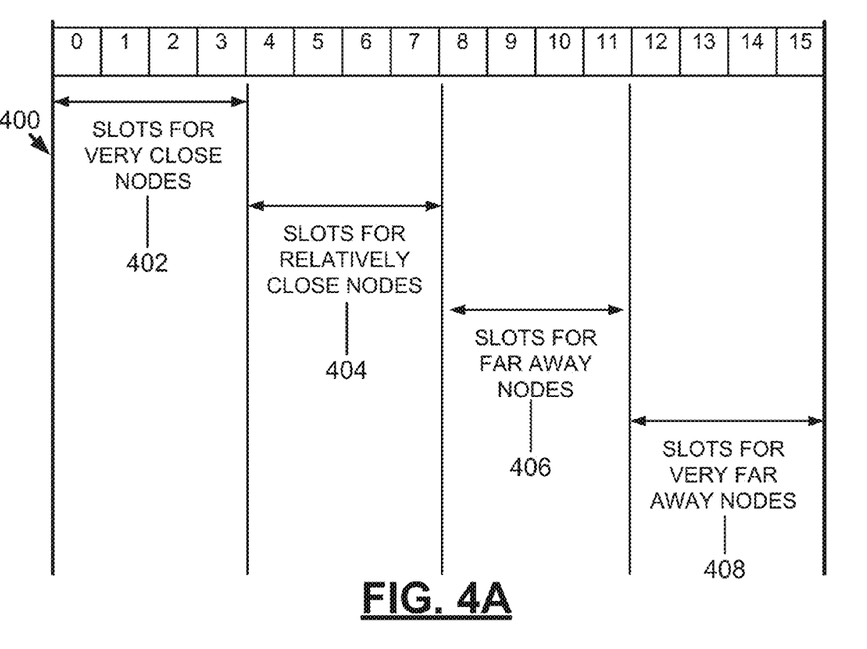
FIGS. 4A and 4B depict example contention windows having ranges of slots assigned to nodes based on distances between the nodes and an access point.
Figure 4B:
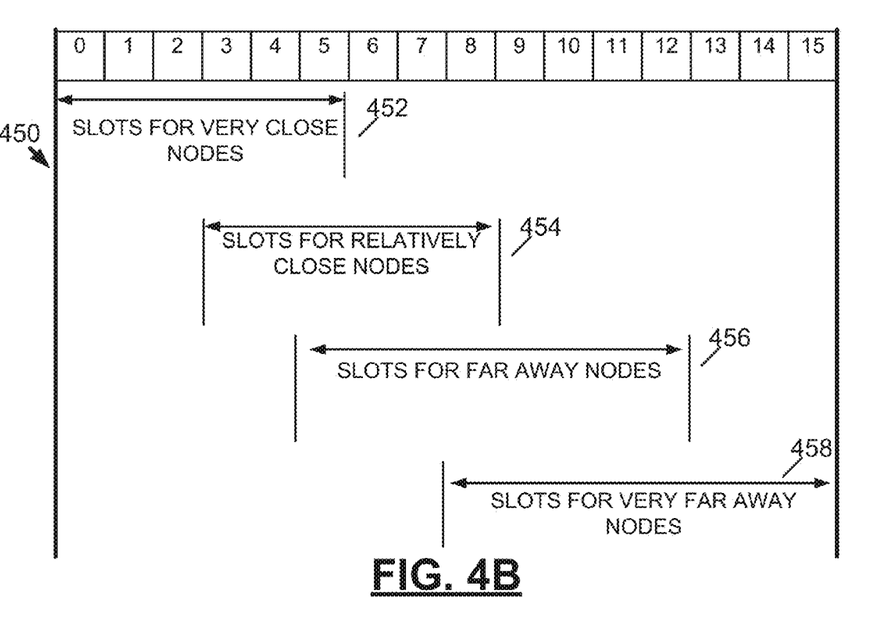

FIGS. 4A and 4B depict example contention windows having ranges of slots assigned to nodes based on distances between the nodes and an access point. In contention-based network access systems, a plurality of contestant nodes compete for a right to join a network. The competition in contention-based systems occurs via a contention window (e.g., contention windows 400, 450 of FIGS. 4A and 4B, respectively), which is a window divided into a number of slots representing communication channels. In one example, the contention window is opened by an access point in the network (e.g., a base station or a node connected to the network seeking to allow another node to connect to the network). During a contention period, each contestant node selects a communication channel from among the slots of the contention window and sends a contention participation message using the selected channel. When several contestant nodes simultaneously attempt to join the network, the contestant node that selects the lowest slot is determined to have won the contention, and a new link in the network is created to connect the winning node to the network.

FIGS. 4A and 4B illustrate contention windows that operate based on measurements of powers of signals transmitted between the access point and each of the plurality of nodes requiring access to the network. As described above, communication networks may be accessed based on the measurements of the powers of signals transmitted between the access point and each of the plurality of nodes requiring access to the network. In accessing networks in this manner, a probability that a node will be given access to the network is based on the measured powers of the signals, and a new link in the network is generated based on the probabilities for each of the nodes. In the context of a contention-based network access mechanism, the probability that a node will be given access to the network may be determined by assigning to the node one or more of the numbered slots of the contention window. The one or more of the numbered slots assigned to the node are the slots that the node is able to select during the contention period. Thus, when selecting a slot of the contention window, a particular node's slot selection choices are constrained based on the determined probability that the node will be given access to the network. Nodes with a higher probability are assigned lower-numbered slots and thus have a greater chance of gaining access to the network. Nodes with a lower probability are assigned higher-numbered slots and thus have a lower chance of gaining access to the network.

FIG. 4A illustrates a contention window 400 having a plurality of non-overlapping ranges of slots, with each range of slots being reserved for a particular class of nodes requesting network access. In the example of FIG. 4A, nodes that are very close to the access point 402 can select only slots 0-3. Because the node selecting the lowest-numbered slot of the contention window wins the contention, the nodes that are very close to the access point 402 are biased to win the contention versus nodes farther away from the access point. Nodes that are relatively close to the access point 404 can select only slots 4-7, nodes that are far away from the access point 406 can select only slots 8-11, and nodes that are very far away from the access point 408 can select only slots 12-15.

In the example of FIG. 4A, the determination of the proximity of the nodes to the access point is not made based on a physical distance measurement but rather based on measurements of powers of signals transmitted between each of the nodes requesting access to the network and the access point. Thus, nodes with signals having a higher measured power are assigned a lower-numbered range of slots, and nodes with signals having a lowered measured power are assigned a higher-numbered range of slots. By assigning to each of the plurality of the nodes one or more of the numbered slots (i.e., assigning to each node one of the ranges of slots 402, 404, 406, 408), the probability that the node will access the network is determined based on the measurements of the powers of the signals transmitted between the access point and the nodes. A new link in the network between the access point and one or more of the plurality of nodes can thereafter be generated based on the determined probabilities.

FIG. 4B illustrates a contention window 450 having a plurality of overlapping ranges of slots, with each range of slots being reserved for a particular class of nodes requesting network access. In the example of FIG. 4B, nodes that are very close to the access point 452 can select only slots 0-5. By being able to select only the lower-numbered slots 0-5, the nodes that are very close to the access point 452 are biased to win the contention versus nodes farther away from the access point. Nodes that are relatively close to the access point 454 can select only slots 3-8, nodes that are far away from the access point 456 can select only slots 5-12, and nodes that are very far away from the access point 458 can select only slots 8-15. The example ranges of slots described in FIGS. 4A and 4B may be modified in various ways (e.g., by defining more ranges or fewer ranges, by changing the sizes of the ranges).

Figure 5:
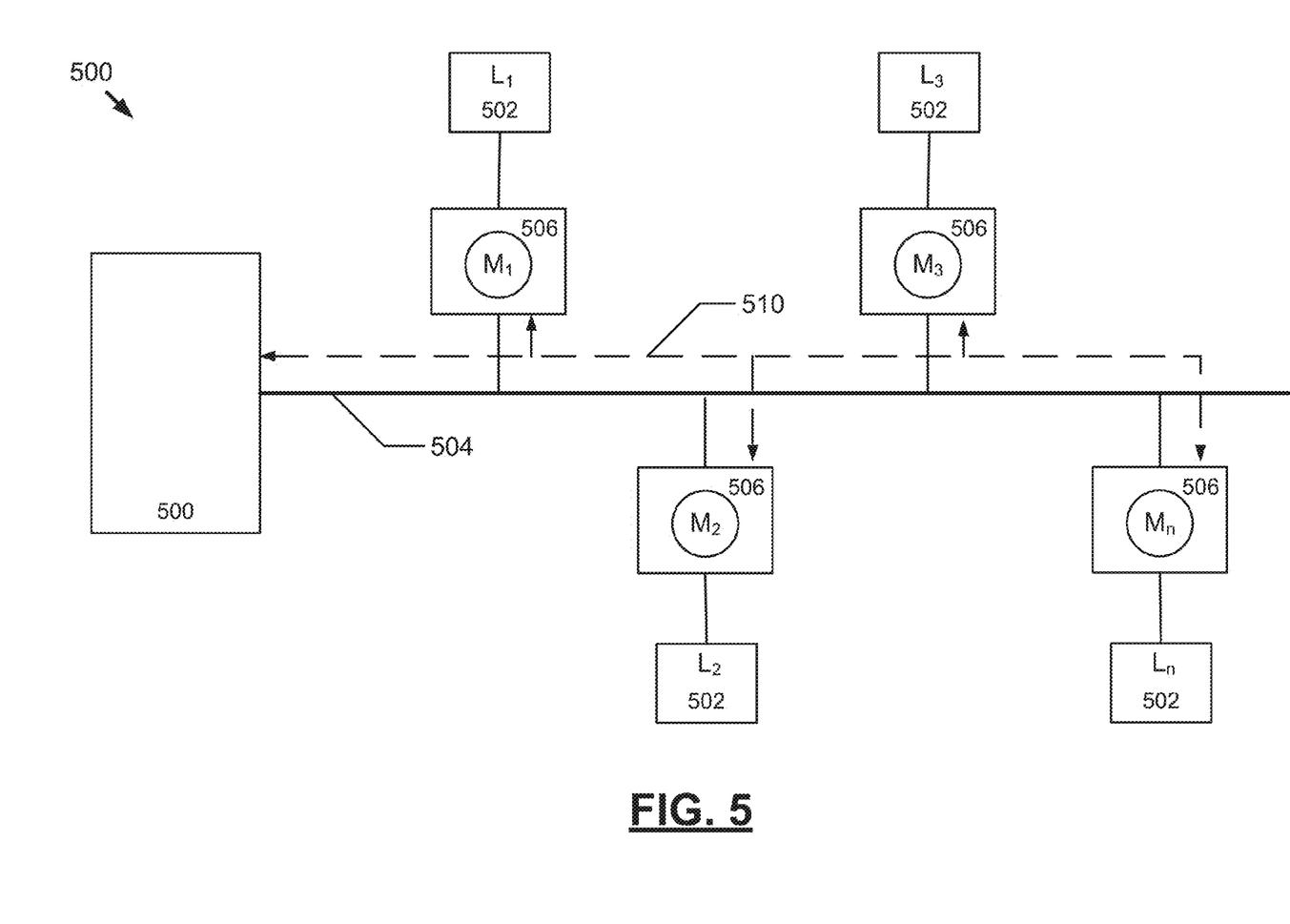
FIG. 5 is a block diagram illustrating an example Advanced Metering Infrastructure (AMI) system.

FIG. 5 is a block diagram illustrating an example Advanced Metering Infrastructure (AMI) system 500. AMI refers to systems that measure, collect, and analyze energy use, and interact with devices such as electricity meters, gas meters, and water meters through various communication media. AMI systems are capable of collecting detailed energy usage data on a frequent basis, thus allowing utility companies to support time-based pricing and demand response programs. A common channel access method used in AMI systems is Time Division Multiple Access (TDMA), where a communications channel is divided into predetermined time slots that are allocated to certain transmitting nodes exclusively on a repetitive basis. AMI systems may thus include large TDMA networks including hundreds or thousands of nodes. Nodes booting up or having lost connection to the network may be required to acquire network access through a contention-based mechanism. Due to the large number of nodes, many contestant nodes may compete to get access to the network via an existing node in the network that has opened a contention window. New links generated by the node opening the contention window are characterized by their physical rates (i.e., megabits per second), which are based on the Signal Noise Ratio (SNR) of the links. SNR is proportional to power, and power is dependent on distance between the newly-connected node and the node opening the contention window.

In FIG. 5, the example AMI system 500 is used in the context of a utility distribution system. As shown in FIG. 5, a utility service is delivered by a utility provider 500 to various loads $L_1$-$L_n$ 502 through a distribution system 504. In one example, the utility service provided is electric power. Consumption of the utility service by the loads 502 is measured at the load locations by meters $M_1$-$M_n$ 506. In the AMI system 500, a goal may be to establish transmission paths between each of the nodes and the utility provider 500.

In one example, the meter 506 is a smart meter and includes a Power Line Communication (PLC) modem used for network communications. The meter 506 may be configured to communicate via a network with the loads 502 (e.g., via a home area network), and the loads may be, for example, smart appliances. Further, the meter 506 may be configured to communicate with the utility provider 500 or any of the other meters 506 via an AMI network 510. The communications between the meter 506 and the utility provider 500 over the AMI network 510 may be used for numerous purposes including scheduling disconnection or connection of utility services to the loads 502, automatic meter reading (AMR), smart-grid applications, and providing additional services such as Internet, video, and audio. The AMI network 510 can be wired, wireless, or a combination of wired and wireless. The AMI network topology may be built using the power-based contention mechanism described above.

Figure 6:
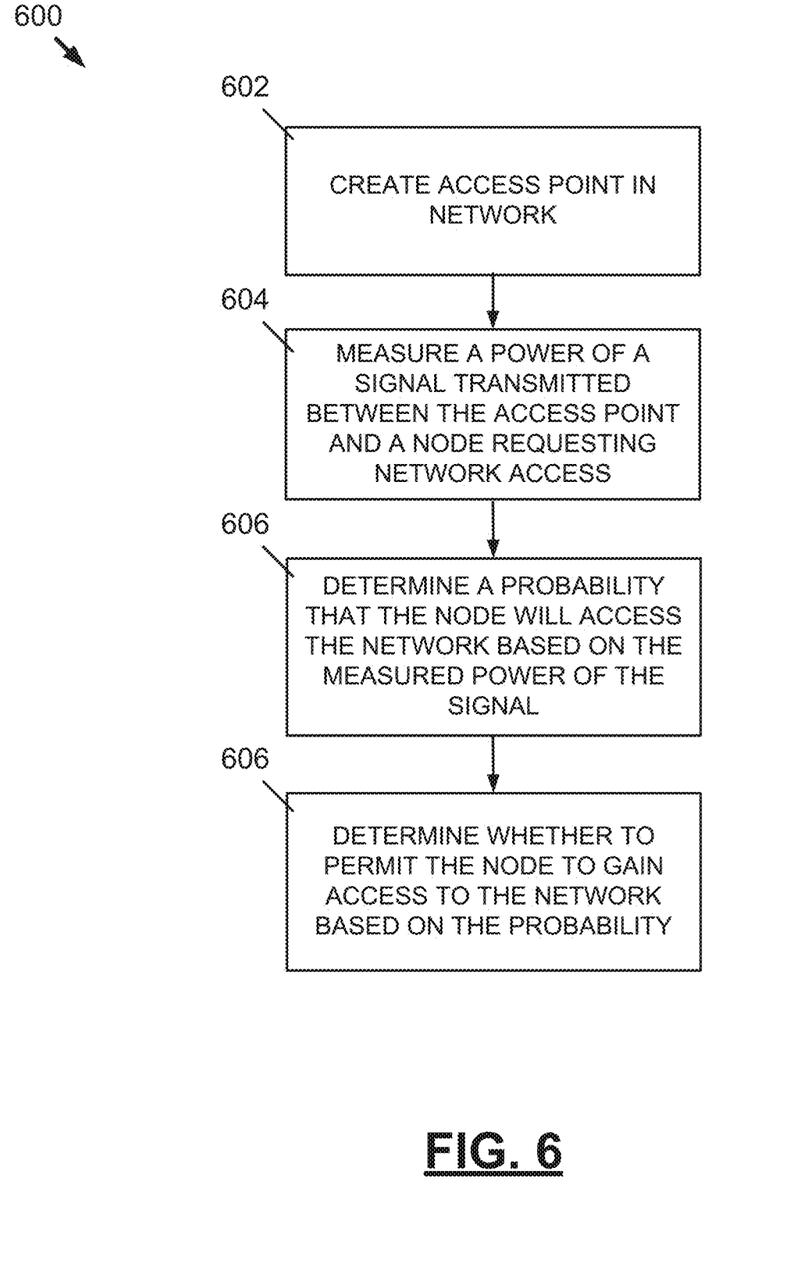
FIG. 6 is a flowchart illustrating a method for accessing a contention-based communications network.

FIG. 6 is a flowchart 600 illustrating a method for accessing a contention-based communications network. At 602, an access point in the network is created. The access point is a node connected to the network that is configured to receive a request from another node to gain access to the network. At 604, a power of a signal transmitted between the access point and a node requesting access to the network is measured. At 606, a probability that the node requesting access will be given access to the network is determined based on the measured power of the signal transmitted between the access point and the node. At 608, a determination is made as to whether to permit the node to gain access to the network based on the probability.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method comprising:
   receiving, by a first node connected to a network, a signal from a second node that does not have access to the network and is seeking to gain access to the network;
   measuring, by the first node, a power of the signal received from the second node;
   selecting, by the first node, a group of communication channel slots based on the measured power of the received signal, wherein the group of communication channel slots is selected from a plurality of groups of communication channel slots that are respectively assigned to different power levels;
   opening, by the first node, the selected group of communication channel slots for the second node to choose from;
   receiving, by the first node, from the second node, a selection of one or more of the communication channel slots from the selected group of communication channel slots; and
   determining, by the first node, whether to permit the second node to gain access to the network based on (i) the measured power of the received signal, and (ii) which one or more communication channel slots the second node selected from the group of communication channel slots.

2. The method of claim 1, wherein the network is an Advanced Metering Infrastructure (AMI) network.

3. The method of claim 1, wherein the determining by the first node results in
   a determination to permit the second node to gain access to the network, and wherein the method further includes:
      in response to the determination, the first node opening a communication link between the first node and the second node, through which the first node is configured to forward communications between the second node and the network.

4. The method of claim 1, wherein the plurality of groups, from which the selection is made, includes a first group, a second group and a third group, and wherein the second group partially overlaps the first group and partially overlaps the third group.

5. The method of claim 1, wherein the plurality of groups, from which the selection is made, includes a first group, a second group and a third group that do not overlap each other.

6. The method of claim 1, wherein the first node performs the determining such that a probably, of the determining resulting in permitting the second node to gain access to the network, is positively related to the measured power of the received signal.

7. A first node comprising:
   a load device configured to consume a utility service and to communicate; and
   a meter device configured to
      measure the load device's utility consumption;
      communicate with a network;
      receive a signal from a second node that does not have access to the network and is seeking to gain access to the network;
      measure a power of the signal received from the second node;
      select a group of communication channel slots based on the measured power of the received signal, wherein the group of communication channel slots is selected from a plurality of groups of communication channel slots that are respectively assigned to different power levels;

open the selected group of communication channel slots for the second node to choose from;
receive, from the second node, a selection of one or more of the communication channel slots from the selected group of communication channel slots; and
determine whether to permit the second node to gain access to the network based on (i) the measured power of the received signal, and (ii) which one or more communication channel slots the second node selected from the group of communication channel.

8. The first node of claim 7, wherein the network is an Advanced Metering Infrastructure (AMI) network.

9. The first node of claim 7, further configured to:
in response to determining to permit the second node to gain access to the network, open a communication link between the first node and the second node, through which the first node is configured to forward communications between the second node and the network.

10. A method comprising:
sending, by a second node that does not have access to a network, to a first node that is connected to a network, a request to gain access to the network;
receiving, by the second node, from the first node, access to the network via a first communication link between the first node and the second node, through which the second node can communicate with the network via the first node;
receiving, by the second node, from a third node that does not have access to the network, a request to gain access to the network;
determining, by the second node, whether to permit the third node to gain access to the network, resulting in a determination by the second node to permit the third node to gain access to the network; and
opening, by the second node and in response to the determination, a second communication link between the second node and the third node, for communications between the third node and the network to be forwarded through the first communication link and the second communication link.

11. The method of claim 10 further comprising:
measuring, by the second node, a power of a signal received from the third node;
wherein the determining by the second node whether to permit the third node to gain access is at least partially based on the measured power of the signal.

12. The method of claim 11, wherein a probably of the determining by the second node to permit the third node to gain access is positively related to the measured power of the signal.

13. The method of claim 10, wherein the determining by the second node includes the second node:
opening a group of communication channel slots for the third node to choose from; and
enabling the third node to select at least one of the communication channel slots from the group; and
determining whether to permit the third node to gain access to the network at least partially based on which one or more communication channel slots the third node selects from the group.

14. The method of claim 10, wherein the determining by the second node includes the second node:
opening a group of communication channel slots for the third node to choose from; and
enabling the third node to select at least one of the communication channel slots from the group; and
determining whether to permit the third node to gain access to the network at least partially based on which one or more communication channel slots the third node selects from the group.

15. The method of claim 14, wherein the group of communication channel slots is one of a plurality of groups of communication channel slots that are respectively assigned to different power levels, and wherein the opening by the second node includes:
measuring, by the second node, a power of a signal received from the third node;
selecting, by the second node, the group from among the plurality of groups based on a measured power of the received signal; and
opening, by the second node, the selected group of communication channel slots for the third node to choose from.

16. The method of claim 14, wherein the plurality of groups includes a first group, a second group and a third group, and wherein the second group partially overlaps the first group and partially overlaps the third group.

17. The method of claim 14, wherein the plurality of groups includes a first group, a second group and a third group that do not overlap each other.

18. The method of claim 10, wherein the network is the Internet.

19. The method of claim 10, wherein the second device is a smartphone.

20. The method of claim 10, wherein the network is an Advanced Metering Infrastructure (AMI) network.

* * * * *